United States Patent [19]
Angelle et al.

[11] 3,911,226
[45] Oct. 7, 1975

[54] INSTALLATION FOR MULTIPLEX TRANSMISSION OF DIGITAL SIGNALS

[75] Inventors: Philippe Angelle, Thouare; Jean-Claude Naudot, Nantes; Maurice Hythier, Carquefou, all of France

[73] Assignee: Compagnie Generale de Geophysique, Massy, France

[22] Filed: May 18, 1973

[21] Appl. No.: 361,815

[30] Foreign Application Priority Data

May 19, 1972 France .............................. 72.18138

[52] U.S. Cl. .......................... 179/15 AL; 179/15 BL
[51] Int. Cl.[2] ............................................ H04J 3/08
[58] Field of Search .................... 179/15 BL, 15 AL

[56] References Cited

UNITED STATES PATENTS 3,586,782 6/1971 Thomas .......................... 179/15 AL
3,752,932 8/1973 Frisone ........................... 179/15 AL

*Primary Examiner*—Ralph D. Blakeslee
*Attorney, Agent, or Firm*—Donald D. Jeffery

[57] ABSTRACT

A plurality of digital detectors (e.g. of seismic vibrations) provide and store digital signals representative of samples of a detected quantity. The detectors are connected in series by a transmission path having a pulse generator at one end and a recording unit at the opposite end. First pulse signals are generated at a multiplexing cycle frequency by the pulse generator. The digital detectors include means for recognising a first pulse signal, means for suppressing or at least altering the recognised first pulse signal before relaying it to the next digital detector and means responsive to the recognised first pulse signal for applying the stored digital signal to the transmission path followed by a new first pulse signal. The next digital detector relays the digital signal(s) of the previous digital detector(s), recognises the new first pulse signal at the end of the said digital signal(s) and adds its own digital signal to the succession of digital signals followed by another new first pulse signal. In this way a multiplexed succession of digital signals from the plurality of detectors is built up and then stored at the recording unit.

32 Claims, 18 Drawing Figures

INSTALLATION FOR MULTIPLEX TRANSMISSION OF DIGITAL SIGNALS

The present invention relates to an installation for the multiplexed transmission of seismic signals delivered in digital form from a plurality of seismic detectors.

U.S. Pat. No. 3,652,979 describes an installation for the transmission of electrical signals from different seismic detectors to a central recording unit. This installation is essentially characterized in that it comprises a single transmission path extending from the central recording unit to a pulse generator mounted on the end of the path. Each detector being associated with the path by way of an assembly comprising a multiplexing element having electronic gates for establishing communication between the detector and the path and a decoding element for controlling the opening of the said gates in response to the reception of a specific set of pulses from the generator in such a way that the detector signals arrive at the central recording unit in a multiplexed sequence corresponding to the frequency at which control pulses are delivered by the generator.

In general terms, the present tendency for the recording and treatment of seismic signals is to replace analogue samples by digital signals.

To do this it is easy to associate with each seismic detector an appropriate system for providing digital signals representative of a sampling of the analogue signal provided by each detector.

To produce the digitally encoded signals, each detector has amplification and conversion means known in themselves for providing a digitally coded signal representative of the value of each detector signal and of the gain applied thereto.

There is thereby provided a digital detector system whose output is presented in the form of a digitally encoded signal capable of being received in a shift register.

For the multiplexed transmission of digital signals from digital detector systems a single transmission path is used which is connected electrically at one end to a recording unit and at its opposite electrical end to a main pulse generator. Each digital detector system is connected to the path by way of a multiplexing assembly.

There are two embodiments of the multiplexing assembly which correspond to two different modes of operation of the said installation.

Each multiplexing assembly comprises, at least one shift register capable of being loaded with digital information delivered by the detector and of being operatively coupled to the downstream side of the transmission path in order to apply digital information thereto in the form of successive coded pulses, means coupled to the upstream side of the transmission path for detecting first pulse signals and means for applying clock pulses to the shift register after detection of a first pulse signal.

Each multiplex circuit also comprises elements in series with the transmission path including means for suppressing at least a part of the first pulse signal.

According to a first embodiment, the main generator emits a single first pulse signal for each multiplexing cycle and each multiplexing circuit comprises means for reapplying the first pulse signal to the path after the application of clock pulses to its own shift register.

According to a second embodiment, the main generator emits from time to time a second pulse signal different from the first pulse signal in order to define the beginning of a multiplexing cycle.

Each multiplexing circuit includes; a multiplexing memory for recording the detection of a first pulse signal, control means for temporarily authorising the said recording of the detection of a first pulse signal, the control means comprising a bistable controlling a gate which is connected in series between the first pulse signal detecting means and multiplexing memory, the gate being controlled to conduct when the bistable is in the ONE state, and means for resetting the state of the bistable to ZERO state in response to the output of the controlled gate.

Each multiplexing circuit also includes means for applying another first pulse signal in place of the first pulse signal thus registered to the downstream side of the transmission path and also means for applying another second pulse signal to the downstream side of the transmission path after the application of clock pulses to its own shift register, said bistable changing state at each detection of a first pulse signal.

The present invention is also concerned with the physical disposition of the transmission path and the different connections of the detector assemblies.

In an installation for multiplexed transmission according to the invention it is convenient and useful in practice to group the main generator and the recording unit in the same laboratory vehicle, that is to say, in substantially the same place.

To do this, the single transmission path must be disposed in the form of an elongated closed loop.

It is convenient in this case to put the two strands of the loop for transmission in opposite directions in the same conducting cable.

An arrangement is easily obtained in which the disposition of each decoding and multiplexing assembly is arranged in two sections which correspond with respective strands of the transmission path. One section is for connection to a detector for multiplexed transmission and the other section is a simple electrical connection.

Connection means comprising two crossed conducting elements connect the different two section assemblies to one another.

Other characteristics and advantages of the invention will appear from reading the detailed description which follows with reference to the accompanying drawings given solely by way of non-limiting examples to illustrate preferred embodiments of the invention, in which:

FIG. 1 is a schematic representation of an installation for the multiplex transmission of digital signals coming from digital detectors;

FIGS. 2, 3, and 4 relate to a first embodiment of this installation, and, more particularly, for the first embodiment;

Figure 3:
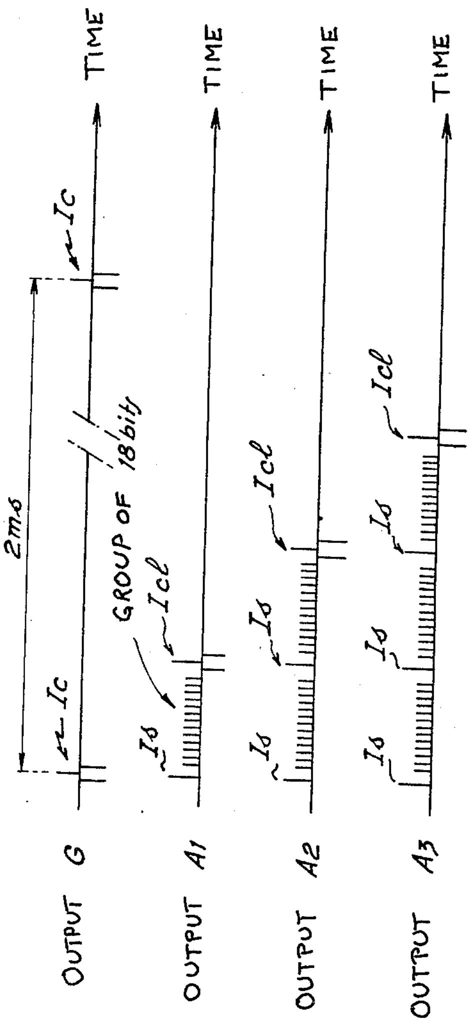
FIG. 3 is a time chart illustrating the output pulses of the main generator at the end of the path and of the different multiplex and decoding assembly.
Figures 5A, 5B, 5C, 5D, 7, 9D, 11, 12:
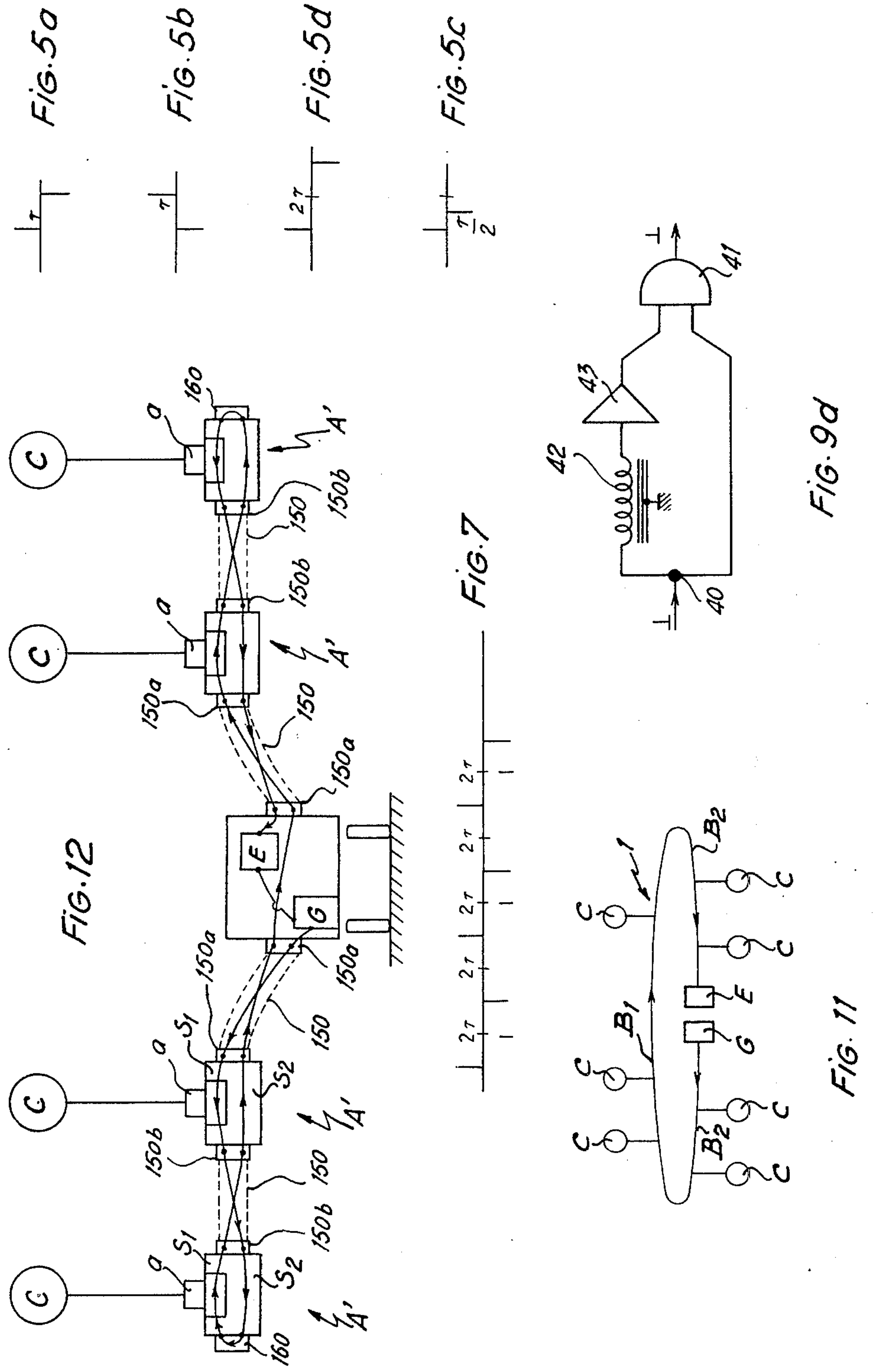
Figure 6:
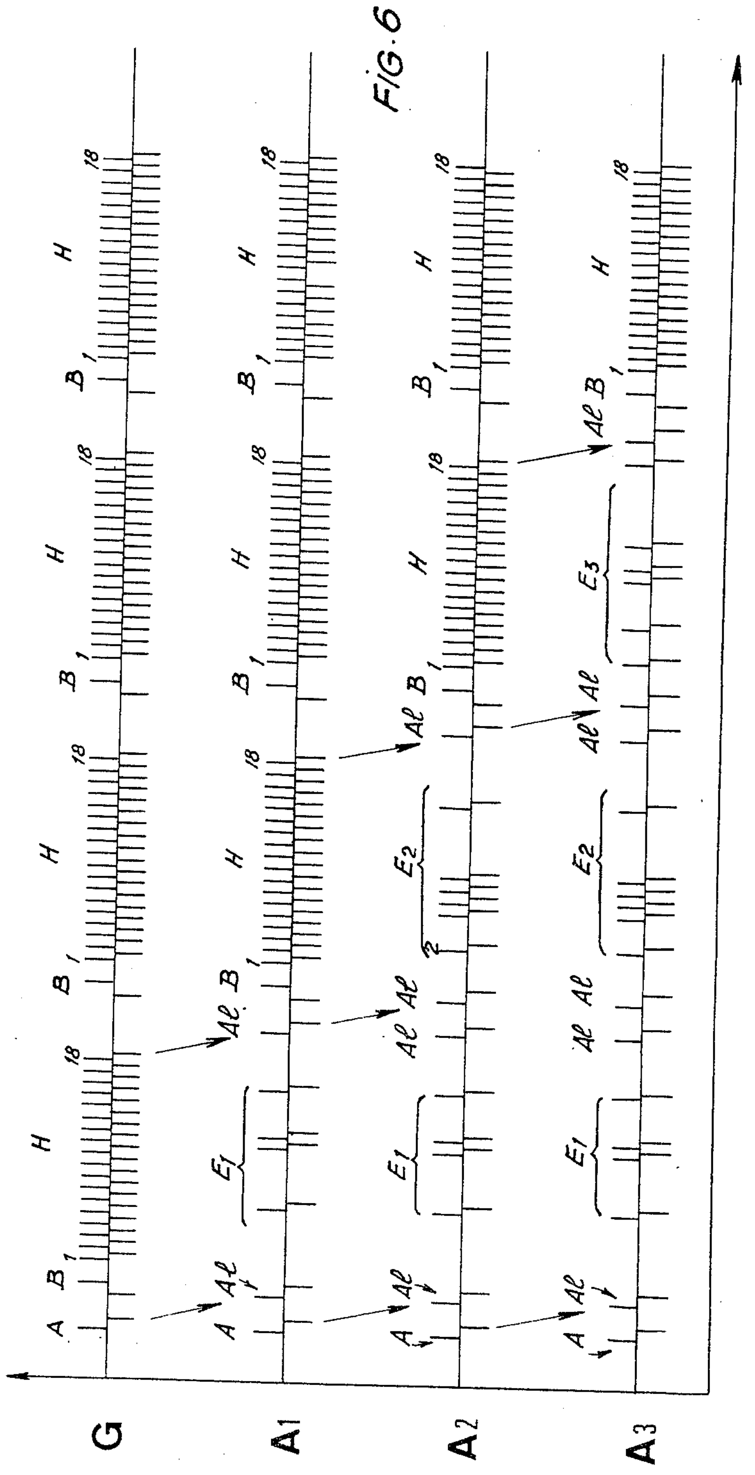
Figures 9A, 9B, 9C:
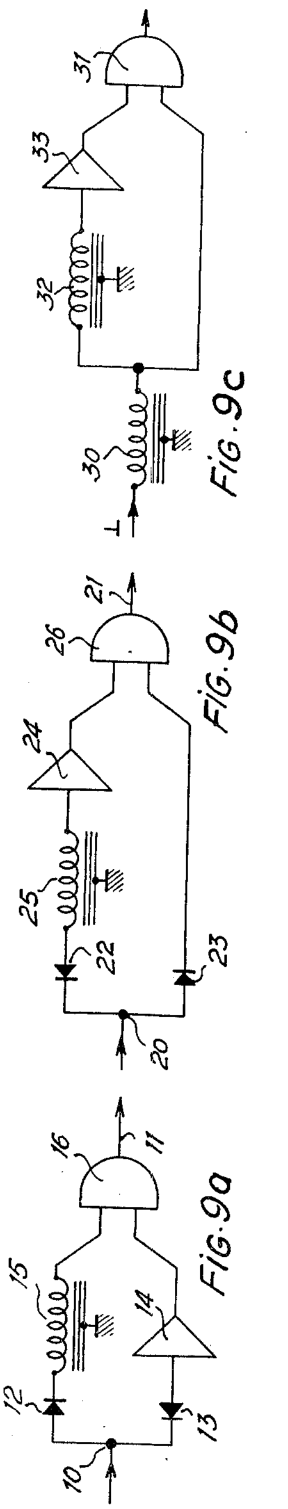
Figure 8:
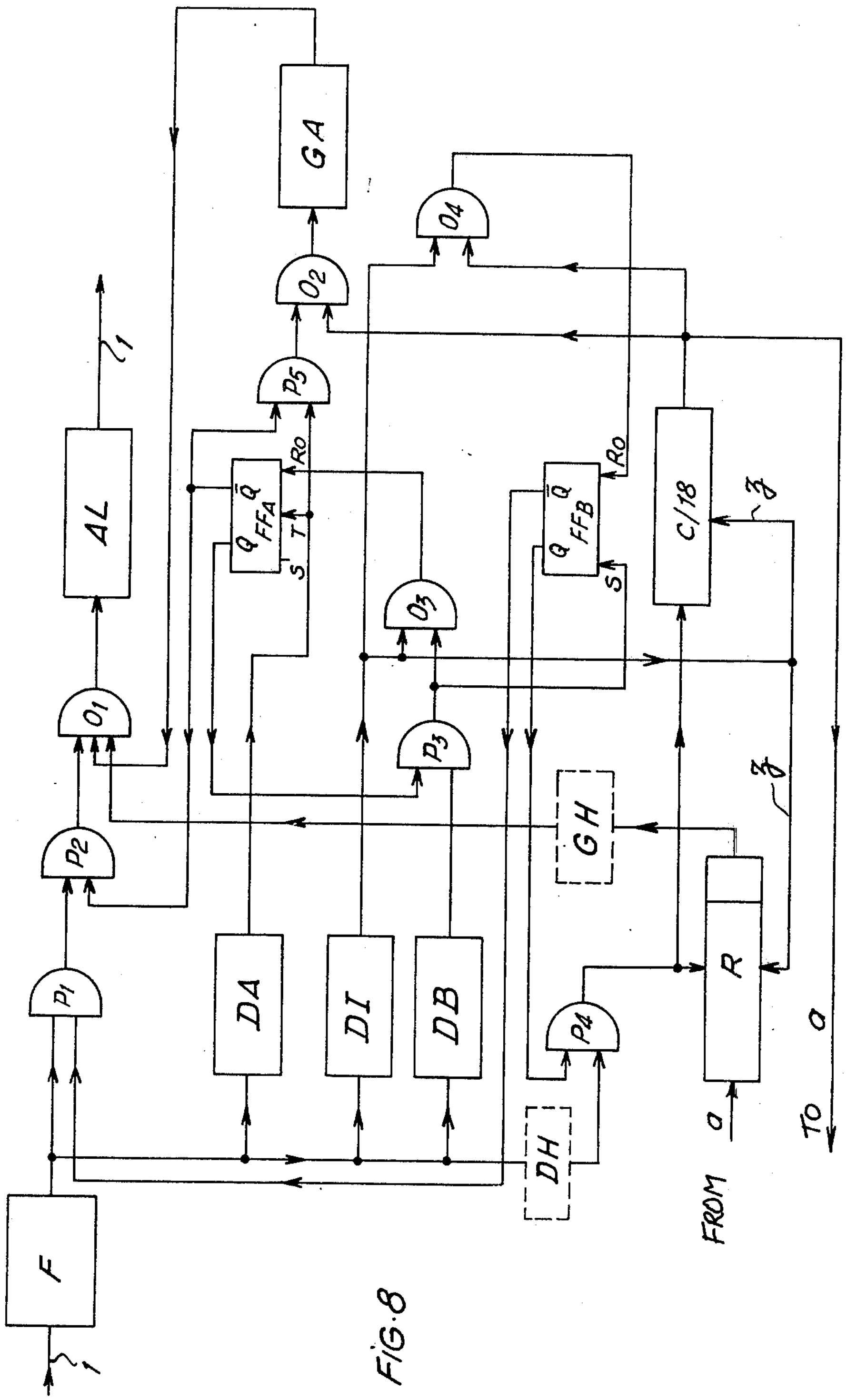
Figure 10:
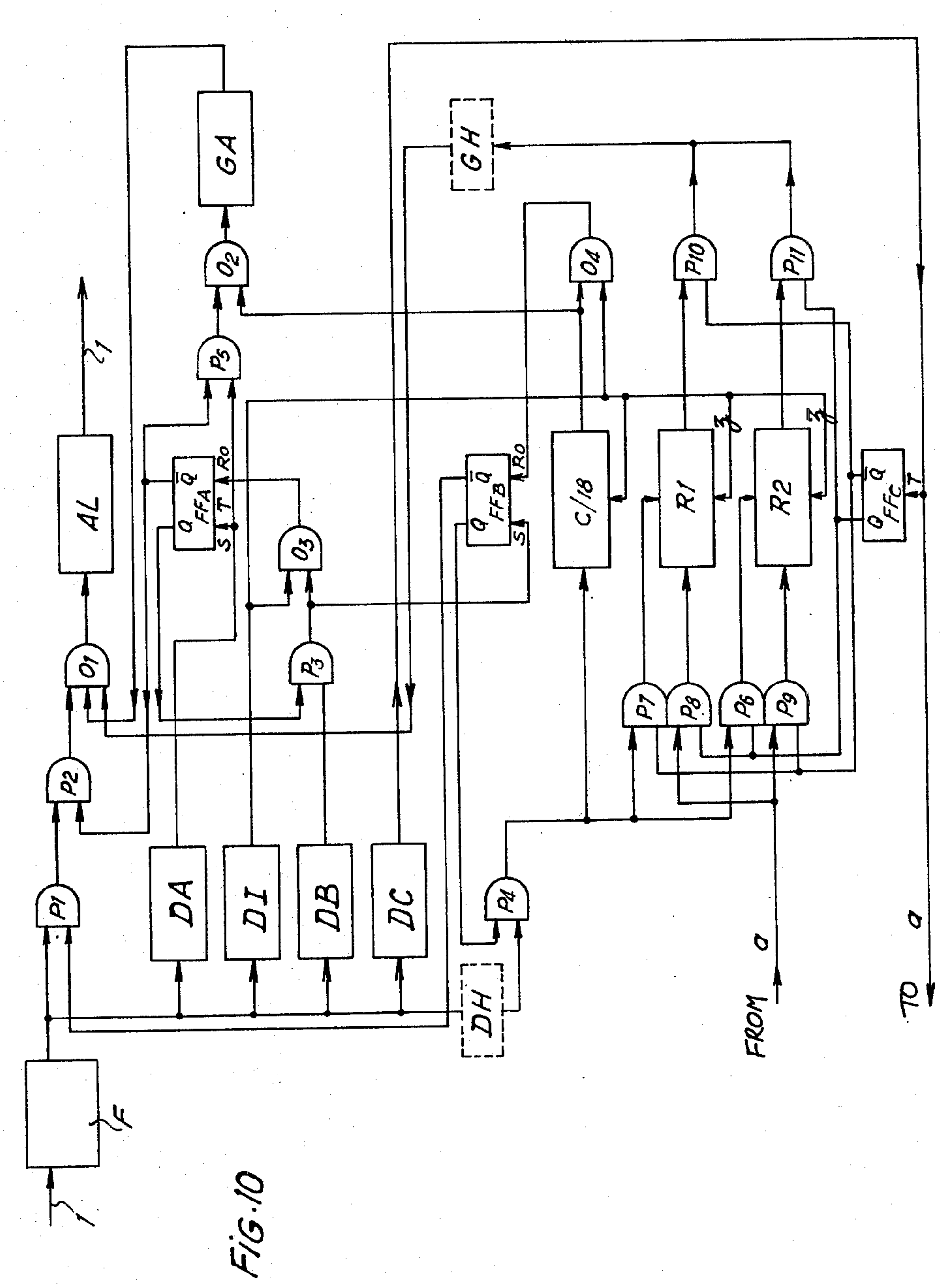

FIGS. 5*a*, 5*b*, 5*c*, 5*d*, 6, 7, 8, 9*a*, 9*b*, 9*c*, and 9*d* relate to a second embodiment of the installation and more particularly:

FIGS. 5*a* to 5*d* show the various types of signal transmitted by the main generator;

FIG. 6 shows a time chart similar to the chart of FIG. 3;

FIG. 7 shows a starting pulse train;

FIG. 8 is a circuit diagram of a decoding and multiplexing assembly associated with each digital detector;

FIGS. 9*a* to 9*d* show various sub-assemblies of the multiplexing and decoding assembly;

FIG. 10 shows a multiplexing and decoding assembly in a variation of the second embodiment in which sampling is performed simultaneously;

FIGS. 11 and 12 relate to a second aspect of the present invention and more particularly:

FIG. 11 shows an installation in which the transmission path is arranged in a loop; and FIG. 12 is a schematic representation of an installation in which the two strands of a looped line are mixed and the assemblies are in two sections.

Figure 1:
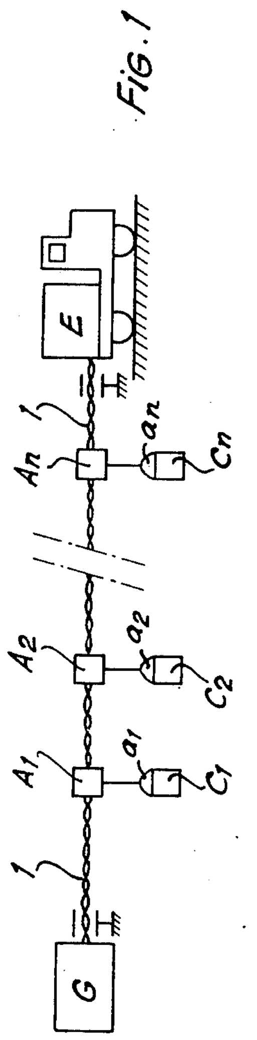

FIG. 1 is a schematic representation of an installation such as the one described in U.S. Pat. No. 3,652,979 for multiplex transmission of analogue signals delivered by detectors in response to seismic vibrations.

The arrangement of the installation is the same for the device of the present invention in which the multiplex transmission is of digital signals delivered by the detectors in response to seismic vibrations.

The arrangement comprises as in the above-mentioned patent a single transmission path 1, a main pulse generator G and a central recording unit E, the generator G and the recording unit E being disposed at opposite ends of the path 1.

Detectors C are coupled to the transmission path 1 between the generator G and the recording unit E and are referenced $C_1, C_2 \ldots C_n$.

Each detector C is a sensor which delivers an analogue signal indicative of the state of vibrations at each instant.

The output of the detector is connected to a digitiser comprising, for example, an amplifier of variable gain and an analogue-to-digital converter. The digitisers are reference $a_1, a_2 \ldots a_n$.

Each digital detector (C, *a*) is coupled to the path 1 by means of a multiplexing assembly or circuit A.

The different multiplex assemblies are referenced $A_1, A_2 \ldots A_n$.

The role of each system *a* is to provide, from the analogue signal of C, a digital signal representative of a sample of the analogue signal and of the gain applied thereto.

The systems *a* do not form part of the present invention and may be embodied by any appropriate known means.

Such a system could include for example :

Low frequency and high frequency filters such as used in the Laboratoire'' SN 328 sold by the Société D'Etudes, Recherches et Constructions Electroniques - (S.E.R.C.E.L.);

an amplifier with a gain which is binary or of floating decimal point; and an analogue-digital converter.

Preferably in a typical example the said converter will provide a coded signal comprising fourteen bits plus one sign bit and three gain bits (eighteen bits in all).

The assembly (C, *a*) thus constitutes a digital detector and it must be repeated that such a digital detector may be embodied by any suitable means without going outside the scope of the present invention.

Each system *a* may comprise an anologue-to-digital converter as sold by the American Company "ANALOGIC".

Each system (C, a) can alternatively comprise the device described in the French Patent Application 72 00799 filed the Jan. 11 1972 by the Société d'Etudes, Recherches et Construction Electroniques (S.E.R.-C.E.L.) for "An amplifier for analogue samples having automatic gain control and a floating point digitising circuit for such samples".

The amplifier with a gain that is binary or of floating decimal point is particularly intended for reducing the dynamic range of the signals before conversion.

The maximal variation of the gain of this amplifier is currently in the region of 84 dB, in jumps of 6 or 12 dB.

The value of the gain is generally encoded in binary form with three bits for jumps of 12 dB or four bits for jumps of 6 dB.

The output of the amplifier feeds a sample-and-hold circuit followed by a analogue-to-digital converter which provides 14 bits plus one sign bit.

In all that follows to simplify the explanation, it will be supposed that in a typical example the jumps are of 12 dB and the gain is coded by means of three bits.

The significant information of a sample of the signal detected by a detector will thus be transmitted in the form of a collection of eighteen bits comprising a fourteen bit mantissa, one sign bit and three gain bits during a total multiplexing period of 8 milliseconds.

The multiplexing assemblies A are made in two different embodiments.

According to the first embodiment (FIG. 2) each assembly A comprises (preferably in a single container B) the following elements: A shift register R receiving in parallel or in series the bits coming from the digital detector (C, *a*);

A source of control pulses H which will be referred to as the clock and which is, for example, a quartz oscillator delivering a train of short pulses at a frequency of 2,857 MHz;

A regenerative circuit F fed directly from the transmission path 1 for reconstituting the positive and negative logical levels;

A detector circuit D which will be more completely described with reference to FIG. 3;

A counter CO controlling a decoding matrix M;

A local generator CL for generating local synchronisation pulses;

A line adaptor AL used for matching the output impedance of the assembly A to the input impedance of the path 1;

A delay line *r;*

A diode *d;*

An AND-gate $P_1$; and

An OR-gate $P_2$.

Circuits for resetting the various memory elements to zero are indicated by the reference *z*.

We begin with a description of the overall operation of the system with reference to the time chart of FIG. 3.

While the device is operating the generator G emits first pulse signals into the path 1. These first pulse signals are indicated as Ic, and are emitted at the frequency of the multiplexing cycle which corresponds in this typical example to a train of Ic pulses being separated from each other by a period of 2 milliseconds.

The multiplexing cycle pulse signals Ic emitted by the generator G comprise two negative pulses separated by 0.7 microseconds with a positive pulse between the negative pulses. This complex signal is emitted by G at intervals of the multiplexing period which in this typical example is 2 milliseconds but which is 4 milliseconds in a variant.

The assemblies A will now be described in detail with reference to their function and in particular with reference to FIGS. 2 and 3.

The first assembly A1 which is fed directly from the generator G receives a multiplexing cycle pulse signal Ic every 2 milliseconds by way of the path 1.

This pulse is regenerated by the circuit F which may be made in any known manner (using levels of ± 5 volts, for example).

The diode *d* suppresses the two negative pulses of the signal Ic and transmits the positive pulse of this signal to the line adaptor by means of the OR-gate $P_2$. This positive pulse is relayed directly into the path 1 on the downstream side of the assembly A1. This positive pulse comprises a separation pulse Is.

The detector D (FIG. 4) comprises a diode $d_1$ which only passes the negative pulses of the Ic signal.

The first negative pulse is delayed by 0.7 microseconds by a delay line $r_1$ so as to arrive synchronously with the second negative pulse at the inputs of an AND-gate P. The gate P thus delivers a pulse at the reception of each Ic signal. The output of the gate P is connected to the set logical ONE terminal of a flip-flop FF which thus passes to the ONE state at the reception of each Ic signal detected by the detector D.

The output terminal of the flip-flop FF is connected to reset the ZERO control of the counter CO as well as to an input terminal of the AND-gate $P_1$ by way of a delay line *r*. The passage of the flip-flop FF to the ONE state resets the counter CO to ZERO and after a delay of 0.35 microseconds opens the AND-gate $P_1$ to control pulses delivered by the clock H with a period of 0.35 microseconds.

These pulses are fed simultaneously to the counter CO and to the shift register R which contains at that moment an encoded sample together with the gain applied thereto.

The output of the clock H also delivers control pulses to the digitiser $a_1$. A circuit, not shown, is provided for the digitiser, $a_1$ so that it can only fill the register R at a moment when the flip-flop is in the ZERO state. These conventional techniques may be embodied in any known manner. This allows the register of the digitiser $a_1$ to empty itself at its own rate which may be very slow in relation to the rate at which the shift register of the assembly A may be emptied.

The 18 sample bits contained in the register R are extracted from the register by the control pulses and are then sent to the path 1 via the OR-gate $P_2$ and the line adaptor AL, thus they follow the separation pulse Is in the path 1 downstream of the assembly $A_1$.

The matrix M fed by the flip-flops of the counter CO (5 bit counter) delivers 3 pulses to the local generator CL corresponding respectively to the instants at which the 19th, the 20th and the 21st pulses are transmitted from the clock H after going through the AND-gate $P_1$.

The generator CL embodied in known manner transforms the negative pulse corresponding to the 20th clock pulse into a positive pulse and thus forms a local signal Ic*l* identical to Ic which is sent into the path 1 by means of the OR-gate $P_2$ and the line adaptor AL following the sample bits coming from the register R.

The last positive pulse of the matrix M resets the ZERO state in the flip-flop FF as well as in the register R by means of the reset to ZERO circuits *z*.

The pulse train at the output of the assembly $A_1$ thus comprises a positive separation pulse Is, 18 positive sample bits and finally a pulse signal Ic*l*.

At the input of the second assembly $A_2$, the positive pulses are relayed directly into the path 1 by way of the regenerator circuit F, the diode *d*, the OR-gate $P_2$ and the line adaptor AL. The signal emitted by the assembly $A_2$ is thus composed of a separation pulse Is, the 18 sample bits of $A_1$ and another separation pulse Is.

The two negative pulses of the pulse train created by the local generator GL of the assembly $A_1$ control the putting of the flip-flop FF into the one state and thereby in the same manner as already described for the assembly $A_1$ the emission in the path 1 of the 18 sample bits of the detector $C_2$ and finally the emission of a pulse signal Ic*l* similar to the pulse signal Ic.

The assembly $A_3$ first allows the sample bits of the detectors $C_1$ and $C_2$ to pass, these two samples being separated and enclosed by separation pulses Is and then sends its own sample bits and a new pulse signal Ic*l* into the path 1.

All the following assemblies up to the assembly $A_n$ function in the same manner as the assemblies $A_2$ and $A_3$.

The central recording unit E finally receives a pulse train composed of a series of digitally encoded samples. The samples from adjacent detectors being separated by a separation pulse Is.

The operating cycle ends and a new first pulse signal Ic of the generator G sets off a new cycle and so on.

The central recording unit E registers the sample bits in a buffer memory which is simultaneously emptied to provide a recording on magnetic tape.

It should be noted that during a seismic recordal certain ones of the detectors may be unused and care should be taken to bear this possibility in mind in the provision of suitable magnetic recordings.

According to a variant each flip-flop FF of each assembly A may be provided with a luminous indicator V which lights while the flip-flop is in the ONE state.

When the power is turned on in each assembly A, the flip-flop FF can be in either the ZERO state or the ONE state. If it is in the ZERO state the AND-gate $P_1$ is closed but if it is in the ONE state the AND-gate $P_1$ is open and the operation cycle can take place.

Figure 2:
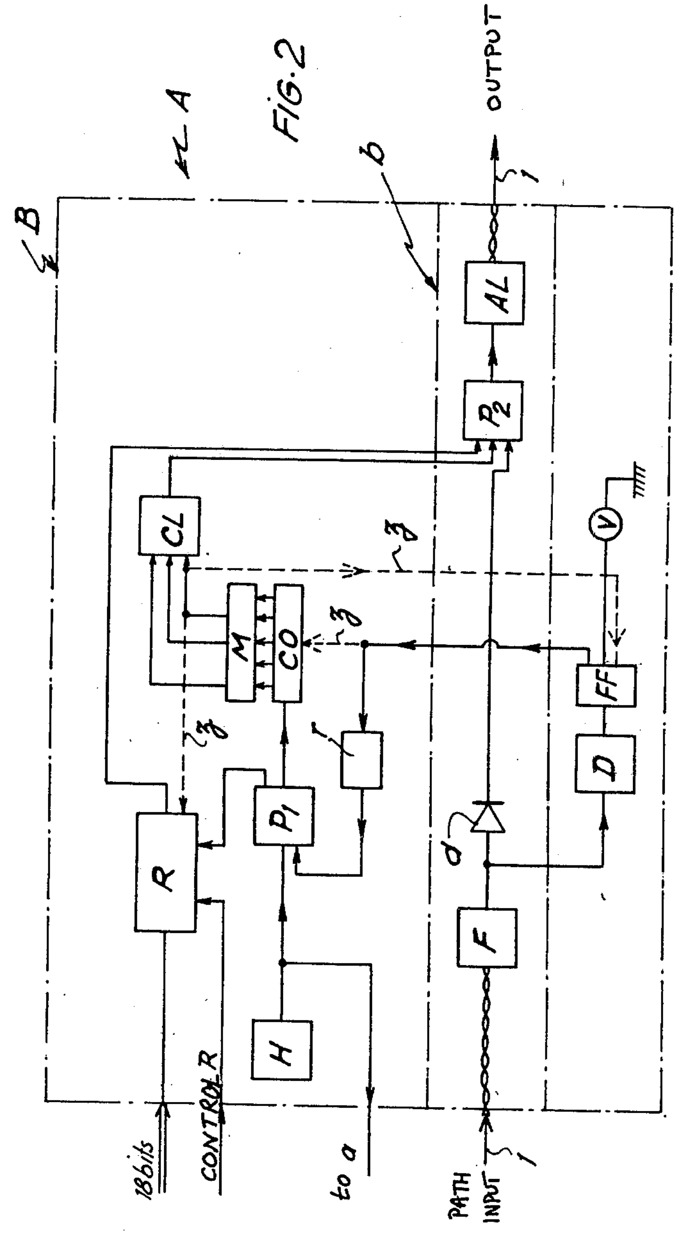
FIG. 2 is a schematic representation of a decoding and multiplexing assembly associated with each digital detector.

It should be noted on FIG. 2 that the line marked "control R" of the shift register R controls the introduction of the numerical sample into the register R.

The circuit which is in series with the path 1 comprising the regeneration circuit F, the diode *d*, the OR-gate $P_2$ and the adaptor AL is preferably encased in a separate container *b* which may be plugged into the container B containing the assembly A.

In the case when this assembly ceases to function the central unit E receives no signals but the detection of the location of the break is easily done because of the light V of the flip-flop which will be out.

One may then easily replace the container *b*.

The second embodiment of the invention will now be described with reference to FIGS. 5*a* to 9*d*.

Figure 4:
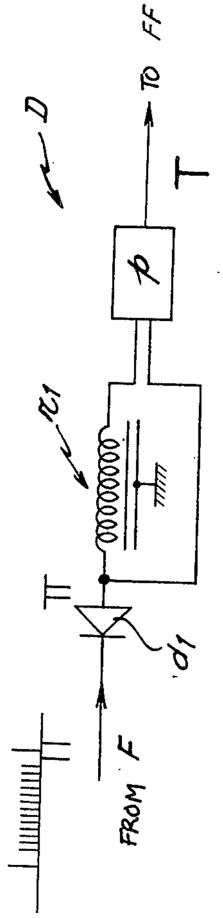
FIG. 4 is a circuit diagram of the detector system.

The references used on these figures are references specific to them and should not be confused with the references of the FIGS. 2 to 4.

The main generator G transmits three types of pulse signals to the path 1.

A signals are referred to as multiplex cycle signals or second pulse signals. These signals follow one another at the multiplex frequency and in a typical example this is every 2 milliseconds. Each A signal comprises a positive pulse followed by a negative pulse separated by a duration *t* as shown in FIG. 5a. When using 250 detectors the period *t* is 0.32 microseconds for a multiplexed cycle of 2 milliseconds.

Extraction signals B referred to as first pulse signals comprising a negative pulse followed by a positive pulse separated by the same period *t*. In the chosen example a B signal is transmitted every 8 microseconds (FIG. 5b).

Control signals which are referred to as third pulse signals or as clock signals H which divide the period separating two B signals into as many parts as there are numerical bits to be transmitted, in the chosen example there are 18 numerical bits and thus 18 pulses $H_1$, $H_2$, . . . $H_{18}$. These clock pulses are composed of a positive pulse followed by a negative pulse separated by a period of $t/2$, (FIG. 5c.)

It is also advantageous to use a train of starting signals I at the setting up of the system to ensure that the circuits of the different assemblies which are described below are put into a starting state.

The starting signals are composed of a positive pulse followed by a negative pulse separated by a period of 2*t* (FIG. 5*d*).

FIG. 7 shows a train of starting signals I emitted at the beginning of operation by the generator G.

FIG. 6 shows a time chart of the pulses present at the output of the generator G and at the outputs of the different successive multiplexing assemblies $A_1$, $A_2$, $A_3$ etc.

It can thus be seen that the generator G emits a pulse train comprised of a multiplex cycle signal A followed by an extraction signal B followed by 18 clock pulses then a series of groups of pulses each one composed of an extraction signal B and 18 clock pulses.

A total number of these groups is equal to the number of assemblies A.

After the emission of the last group the cycle restarts.

The various multiplex assemblies A as well as their operation will now be described with reference to FIGS. 1, 6 and 8.

The generator G first emits a train of pulses I which is received in the assembly $A_1$, by the regeneration circuit F and is then detected by the detector DI. The detector DI whose structure is described in more detail below delivers an output pulse when it recognises a starting signal I. The detector DI of the assembly $A_1$ delivers an output pulse on the reception of the first I pulse thus resetting the register R and the counter C/18 to ZERO and also setting the ZERO state in the flip-flops FFA and FFB by way of the OR-gates $O_3$ and $O_4$.

In the ZERO state the flip-flop FFB opens and the AND-gate $P_1$ while the flip-flop FFA in the ZERO state opens the AND-gate $P_2$. The following I signals will thus be retransmitted in the path 1 by way of the gate $P_1$, the gate $P_2$, the gate $O_1$ and the line adaptor AL.

In the same manner the AND-gates $P_1$ and $P_2$ of the assembly $A_2$ will be opened and the register R and the counter C/18 of that assembly will be reset to ZERO on the reception by this assembly of an I signal which will, in fact, be the second I signal emitted by the generator G, and so on up to the assembly A. At the end of the emission of this train of I pulses, the registers and the counters of all the assemblies will be reset to ZERO the AND-gates $P_1$ and $P_2$ of all the assemblies will be open and the flip-flops FFA and FFB of all the assemblies will be in the ZERO state.

The generator G then emits the cycle of pulses shown in FIG. 2 into the path 1.

The assembly $A_1$ receives first an A signal which is relayed into the path 1 by means of the gates $P_1$, $P_2$, $O_1$ and the line adaptor AL.

At the same time the detector DA delivers an output pulse when it recognises the A signal.

The detector DA (FIG. 9*a*) comprises two diodes 12 and 13, an invertor 14, a delay line 15 and an AND-gate 16; the delay line introduces a delay of duration *t*.

On the reception of an A signal the positive pulse passes through the diode 12 and the delay line 15 while the negative pulse passes through the diode 13 and is transformed into a positive pulse by the invertor 14. The AND-gate 16 thus receives two positive pulses simultaneously and delivers an output pulse on the line 11.

The detector DA on the reception of the A signal delivers an output signal which is transmitted both to the gate $P_5$ and to the trigger input of the flip-flop FFA to make it change its state. This flip-flop has its J and K inputs permanently connected to the ONE level.

The second input of the gate $P_5$ being at the ONE level since the flip-flop FFA was initially in the zero state, and the AND gate $P_5$ delivers an output pulse which controls the generator GA by way of the OR-gate $O_2$.

The output pulse delivered by DA changes the state of the flip-flop FFA to the ONE state. This change having effect from the end of the pulse since it is applied to the trigger input of the said flip-flop. Thus the same pulse delivered by DA has enough time to pass through the AND-gate $P_5$.

Putting the flip-flop FFA into the ONE state closes the AND-gates $P_2$ and $P_5$ and opens the AND-gate $P_3$. The generator GA (FIG. 9c) at the reception of the pulse delivered by the gate $P_5$ itself delivers a pulse signal A. This generator comprises a delay line 30 which introduces a delay of period 2*t* and whose output is connected directly to one input of an OR-gate 31 and to the other input of the OR gate 31 via a delay line 32 (of period *t*) and an invertor 33. The pulse signal A at the output of the regeneration circuit F is thus relayed in the path 1 without delay when the signal A*l* emitted by the generator GA is emitted at the end of a period 3*t* corresponding to the delay introduced by the delay lines 15 of DA and 30 of GA. Consequently, on the reception of an A signal the assembly $A_1$ emits in the path 1 the same A signal followed by an A*l* signal of the same form.

After emission of the A*l* signal the gates $P_1$ and $P_3$ are opened while the gates $P_2$ and $P_5$ are closed. The flip-flop FFA being in the ONE state and the flip-flop FFB still being in the ZERO state.

It is in this state that the assembly $A_1$ receives the first B signal emitted by the generator G. The B signal is blocked by the gate $P_2$ but it is recognised by the detector DB. The detector DB (FIG. 9b) comprises between its input 20 and its output 21, two diodes 22 and 23, an invertor 24, a delay line 25 (delay period *t*) and an AND gate 26. The detector DB thus delivers an impulse when it recognises a first impulse signal B whatever its arrival position may be.

On the reception of the first B signal emitted by the generator G, the detector DB emits an output pulse which goes through the AND gate $P_3$, this being open because of the ONE state of the flip-flop FFA. This pulse resets the ZERO state into the flip-flop FFA after passing through an OR-gate $O_3$ and puts the flip-flop FFB into the ONE state. Putting the flip-flop FFB into the ONE state opens the AND-gate $P_4$ and closesthe AND-gate $P_1$. Putting the flip-flop FFA into the ZERO state closes the AND gates $P_3$ and opens the AND gates $P_2$ and $P_5$.

The B signal emitted by the generator G is thus recognised by the assembly $A_1$ but is blocked by it. The assembly $A_1$ thus receives by the path 1 the 18 clock pulses H emitted by the generator G. These pulses are blocked by the gate $P_1$ which is closed and are recognised by the detector DH.

It should be noted that the presence of the detector DH is optional and for this reason it has been represented by a dashed-line on FIG. 8, as well as the generator GH whose presence is also optional.

The detector DH has a structure analogous to that of DA as has the DI, save that their delay line lengths are *t*/2 and 2*t* respectively. Similarly the generator GH has the same structure as the generator GA, save only for the value of the delay line. The detector DH after recognises the H pulses and emits after each of the pulses a register control pulse which is transmitted to the register R by way of the gate $P_4$ previously opened by the flip-flop FFB being in the ONE state. These 18 control pulses empty the register R of its 18 bits of information into the path 1 by way of the generator GH, the OR-gate $O_1$ and the line adaptor AL. The control pulses pass through the gate $P_4$ and are counted by the counter C/18 embodied in known manner which delivers an output pulse after detecting 18 pulses at its input. This output pulse of the counter C/18 serves as a control pulse for the generator GA by way of the gate $O_2$ the generator then emitting an impulse signal A*l* which is transmitted to the path 1 by way of the gate $O_1$ and the line adaptor AL.

This counter output pulse also serves as a control pulse for the digitiser which again sends 18 sample bits into the register R which has just been emptied. And finally this counter output pulse returns the flip-flop FFB to the ZERO state by means of the gate $O_4$.

Putting the flip-flop FFB into the ZERO state opens the gate $P_1$ and closes the gate $P_4$.

The assembly $A_1$ on receiving an A signal then a B signal then 18 H signals emitted by the generator G has sent into the path 1 the same A signal then an A*l* signal then the sample bits then finally a new A*l* signal. The assembly $A_1$ thus receives the first group of pulses comprising a B signal followed by 18 clock pulses. Each of these groups is transmitted directly to the path 1 downstream of $A_1$ since the gates $P_1$ and $P_2$ are open. The B signal and the clock pulses H have no effect on the state of the assembly $A_1$ since the gates $P_3$ and $P_4$ are closed by the ZERO state of the two flip-flops FFA and FFB. the other consecutive groups will also pass directly into the path 1 downstream of $A_1$ and only the presence of an A pulse at the beginning of the next multiplex cycle will modify the state of the assembly $A_1$. The various gates and flip-flops of this assembly will change state only at the beginning of the next multiplex cycle.

The operation of the assembly $A_2$ which has a structure identical to that of the assembly $A_1$ will now be studied.

The assembly $A_2$ receives a pulse train composed in the way shown in FIG. 6 at $A_1$. The first A signal passes directly into the path 1 downstream of $A_2$ as mentioned above in the operation of the assembly $A_1$. This A signal is also recognised by the detector DA and allows the emission into the path 1 on an A*l* signal as mentioned above and sets the ONE state in the flip-flop FFA which closes the gates $B_2$ and $B_5$ and opens the gate $B_3$.

The A*l* signal received immediately after is blocked by the gate $P_2$ and is recognised by the detector DA whose output resets the flip-flop FFA to the ZERO state by means of its trigger input but is otherwise blocked by the gate $P_5$. The gates $P_2$ and $P_5$ are again opened and the gate $P_3$ is closed.

Consequently the A*l* signal (which upstream of the multiplexing assembly, was behind the A signal) has been blocked but the detection of the A signal has the result, as before, of the application of a new A*l* signal downstream of the multiplexing assembly to replace the one which was blocked.

After that, the sample bits of the detector $C_1$ arriving upstream are directly transmitted downstream into the path 1 by the gates $P_1$ and $P_2$ which are open and have no influence on the state of the assembly $A_2$.

The assembly $A_2$ is thus in the same state as the assembly $A_1$ at the beginning of the multiplexing cycle and it receives an A*l* signal followed by N - 1 groups of pulses comprising a B signal and 18 clock pulses. Its behaviour is thus exactly the same as the behaviour of the asssembly $A_1$ when receiving the A signal emitted by the generator G.

In particular the A*l* signal is transmitted directly downstream on the transmission path 1 at the same time as it sets the ONE state in the flip-flop FFA preparing the multiplex assembly $A_2$ to receive the first pulse signal B which will cause the removal of digital information contained in the shift register R.

The behaviour of the different assemblies $A_3 \ldots A_N$ can be easily deduced by the behaviour of the assemblies $A_1$ and $A_2$.

It will be noted that each group of two adjacent A or A*l* signals has no effect on any of the assemblies $A_1$ to $A_N$ and is reproduced without change on the path 1 downstream of each assembly. That is why it is necessary when emitting a digital sample into the path 1 to surround it with two A*l* signals which will enable the sample to pass without interruption through the following multiplex assemblies and will put, after this passage, each assembly A into a state for emitting its own numerical sample into the path 1. Finally it is clear that all the digital samples pass successively along the path 1 in the order of the detectors. They arrive in this order at the recording unit E in a multiplex form.

Naturally the type of pulse signals A, B, H and I which have been shown are merely preferred types. However, it is important that the average value of these signals should be nil especially in the case of a connection by way of transformers or condensers. In fact the dc component is thus rendered zero and the passage through transformers or capacitors will not destroy any information. In the case of the H pulses having a zero average value, the shift register R and counter C/18 may be connected thereto via a diode eliminating for example, the negative part of the pulses. One can also use as in the previous example, a detector DA which was shown on the FIG. 8 as an optional element.

It may be interesting in certain cases to arrange for the analogue sampling of all the digital detectors to take place simultaneously. To do this multiplex assemblies A such as shown in FIG. 10 may be used. These assemblies are similar to the assemblies already described save only that they comprise two shift registers instead of a single shift register and have switching elements associated with the two registers. They also include a supplementary detector DC which is used to control the switching between the two registers and the analogue sampling. In order to fire simultaneous analogue sampling before encoding of all the detector signals a fourth pulse signal C is used which is emitted by the main generator in front of the pulse train corresponding to each multiplexing cycle. The C signal is thus emitted before the A signal supposing that all the assemblies A have already received the starting signals.

The C signal on arriving at the assembly $A_1$ is readmitted in the path 1 downstream of this assembly provided that before the beginning of the multiplex cycle the gates $P_1$ and $P_2$ of all the assemblies are opened. The C signal can thus be transmitted to all the assemblies along the path 1.

At each assembly the C signal is recognised by the detector DC which may be embodied in any known way according to the type of C signal chosen.

The C signal could be for example of the same type as the A, B, H or I signals and the detector DC could be embodied in the same way as the detectors already described.

After receiving a C signal, the detector DC delivers an output pulse which is sent to the trigger input of a flip-flop FFC. At each reception of a C signal the flip-flop changes from ONE state to the other. The device switching the registers $R_1$ and $R_2$ is composed of AND-gates $P_6$ and $P_7$ which deliver the control pulses of the two registers, AND-gates $P_8$ and $P_9$ through which the sampling signals coming from the digitiser pass and finally AND-gates $P_{10}$ and $P_{11}$ which connect the output of the registers to the path 1 downstream of the assembly A. Each pulse delivered by the detector DC controls the sampling and the removal of the sample from the digitiser. This pulse also controls the changing over of the flip-flop FFC. If this flip-flop is, for example, in the ONE state, the gates $P_6$ and $P_8$ are open as is the gate $P_{11}$ while the gates $P_7$, $P_9$ and $P_{10}$ are closed. The sample coming from the digitiser is thus introduced into the register $R_1$ via the gate $P_8$ and the clock pulses H of the multiplexing cycle empty the register $R_2$ while going through the gate $P_6$, the sample bits having been sent to the path 1 by the gate $P_1$. At the beginning of the next multiplexing cycle, the flip-flop FFC changes to ZERO state and it is the register $R_1$ filled in the previous cycle which is emptied into the path 1 and it is the register $R_2$ which is filled by the new sample coming from the digitiser *a*. This solution has the great advantage that the analogue samples have practically no time shift between the different detectors within each multiplex cycle. The only shift in this sampling results from the propagation time of the C signal in the path 1. It is, in fact, useful in practice to be able to process recordings corresponding to a single instant for all the detectors, in particular, for a good reconstruction of the first arrivals (detection of the beginning of a signal).

It will be noticed in this embodiment that if the A and A*l* signals are disregarded, since they happen to be signals for indicating the arrival of the clock pulses H on the transmission path 1, it is the pulse C which controls the analogue sampling once per cycle simultaneously for all the detectors while it is the first pulse signals B which control the successive multiplexing of all the detectors.

Because of this fact the C signal may be considered as a second pulse signal defining the beginning of a multiplexing cycle and the isntant of analogue sampling, while as before the first impulse signals B define the multiplexing or more precisely the extraction of the digital information successively at each different digital detector.

FIGS. 11 and 12 relate to a variation applicable to all the embodiments described so far.

FIG. 11 shows a physical arrangement of the line 1 in which it is arranged in a loop going from the generator G to a recorder E, which are arranged close to each other as, for instance, in the same mobile laboratory. This arrangement is clearly equivalent to the arrangements of FIG. 1.

According to a second aspect of the invention in FIG. 12, two strands $B_1$ and $B_2$ of the line are regrouped into a single conducting cable having two line elements therein, for example, a cable with two times two wires.

In this arrangement each assembly A′ comprises two sections, a first section, $S_1$, to which a detector is attached for decoding and multiplexing as in the assemblies A already described and a second section, $S_2$, comprising a simple electrical connection of one of the line elements of the cable *f*.

The two sections assemblies A′ are interconnected by connection means 150, in which the two line elements are crossed. The connecting of the connection means 150 to the assemblies A′ is done by two types of connecting elements 150*a* and 150*b* which are not identical. Each assembly having an element 150*a* on one side and an element 150*b* on the other side. There are also two types of connection means 150, one type having connection elements 150*a* at both ends and the other type having connection elements 150*b* at both ends.

At the two ends of the installation the continuity of the line between the two elements is maintained by connecting elements 160 which are advantageously constituted by fixed plugs.

Such an arrangement is equally applicable to the multiplexing of analogue signals as to the multiplexing of digital signals and is particularly useful in practice since it enables the user of the installation to arrange the assemblies in a linear disposition in the usual manner.

Also the difference between the connecting elements 150*a* and 150*b* avoids any error in assembly Finally it may be noticed that in a general fashion the assemblies A and A′ which have been described in the present specification can naturally incorporate repeater systems, that is to say, systems capable of amplifying in known manner the level of transmitted signals.

The invention is of course not limited to the embodiments described, but extends to all variations falling within the spirit of the invention, in particular, the invention is applicable to the multiplexed transmission of digital signals regardless of their origin which need not necessarily be seismic.

What is claimed is:

1. Installation for the multiplex transmission of seismic signals delivered by a plurality of sensors comprising a transmission path having one end connected to a generator of first pulse signals and the other end connected to a recording unit, each sensor being coupled to the path by means of a multiplexing circuit connected in series with the path, characterized in that the generator provides a short first pulse signal at the beginning of each multiplexing cycle, that each sensor provides in digital form the detected information and that each multiplexing circuit comprises at least one shift register capable of being loaded with the digital information from said sensor and of being operatively coupled to the downstream side of the transmission path in order to apply the digital information thereto in the form of a succession of encoded pulses, the multiplexing circuit also having first pulse signal detector means coupled to the upstream side of the transmission path and means for applying clock pulses to the shift register after the detection of the first pulse signal, said means for applying clock pulses to the shift register comprising a source of clock pulses and means responsive to the detection of the first pulse signal to apply a predetermined number of clock pulses from the source to the shift register.

2. Installation for multiplex transmission according to claim 1 characterised in that each multiplexing circuit comprises, as an element in series with the transmission path, means for suppressing at least a part of the first pulse signal, and means for re-applying a first pulse signal to the path after the application of clock pulses to its own shift register.

3. Installation for the multiplex transmission of signals delivered by a plurality of sensors, comprising a transmission path having one end connected to a generator of first pulse signals and the other end connected to a recording unit, each sensor being coupled to the path by means of a multiplexing circuit connected in series with the path characterised in that each sensor is adapted to provide in digital form the detected information and that each multiplexing circuit comprises a. at least one shift register capable of being loaded with the digital information from said sensor and of being operatively coupled to the downstream side of the transmission path in order to apply the digital information thereto in the form of a succession of encoded pulses,
b. first pulse signal detector means coupled to the upstream side of the transmission path,
c. means for applying clock pulses to the shift register after the detection of the first pulse signal, and
d. means for suppressing at least a part of the first pulse signal and placed in series with the transmission path; the first pulse signals comprising pulses of one or other polarity while the digital information signals comprise pulses of a single polarity, and the means adapted to suppress at least a part of the first pulse signals comprising a diode mounted to conduct for the polarity of the digital information.

4. Installation for multiplex transmission according to claim 3 characterised in that each multiplexing circuit further includes means for re-applying a first pulse signal to the path after the application of clock pulses to its own shift register.

5. Installation for the multiplex transmission of signals delivered by a plurality of sensors comprising a transmission path having one end connected to a generator of first pulse signals and the other end connected to a recording unit, each sensor being coupled to the path by means of a multiplexing circuit connected in series with the path, characterised in that each sensor provides in digital form the detected information and that each multiplexing circuit comprises: a. at least one shift register capable of being loaded with the digital information from said sensor and of being operatively coupled to the downstream side of the transmission path in order to apply the digital information thereto in the form of a succession of encoded pulses, b. first pulse signal detector means coupled to the upstream side of the transmission path,
c. means for applying clock pulses to the shift register after the detection of the first pulse signal,
d. a multiplex memory to register the detection of a first pulse signal, and
e. means for authorizing temporarily such registration of the detection of a first pulse signal, wherein the means adapted to apply clock pulses to the shift register is responsive to the registration of the detection of a first pulse signal.

6. Installation for multiplex transmission according to claim 5 characterised in that each multiplexing circuit further includes as an element in series with the transmission path means for suppressing at least a part of the first pulse signal.

7. Installation for multiplex transmission according to claim 6 characterised in that the means for authorizing temporarily the registration of detection of a first pulse signal comprises a bistable element controlling a gate connected in series between the multiplex memory and the means for detecting the first pulse signal, the gate being controlled to conduct when the bistable is in ONE state, and means for resetting the bistable to a ZERO state in response to the output of the controlled gate.

8. Installation for multiplex transmission according to claim 7 characterised in that the generator is arranged to produce from time to time a second pulse signal A different from the first pulse signals defining the beginning of a multiplexing cycle and in that the means for authorizing temporarily the registration of the detection of a first pulse signal comprises also means for making the bistable go to the ONE state in response to the detection of the second pulse signal.

9. Installation for multiplex transmission according to claim 8 characterised in that each multiplexing circuit also comprises means for applying downstream on the transmission path another second pulse signal in place of the first pulse signal thus registered, and also means for applying downstream on the transmission path another second pulse signal after the application of clock pulses through its own shift register, the said binary cell changing state at each detection of a first pulse signal.

10. Installation for multiplex transmission according to claim 9 characterised in that the means for suppressing at least a part of the first pulse signals comprises a gate in series with the transmission path, the said gate being controlled to the blocked state while the bistable is in the ONE state.

11. Installation for multiplex transmission according to claim 9 characterised in that the generator produces a predetermined number of third pulse signals after each first pulse signal, the third pulse signals being different from the first and the second pulse signals and that in each multiplexing circuit the means for applying clock pulses to the shift register comprises a gate responsive to the registration in the memory of the detection of a first pulse signal to let pass at least a part of the third pulse signals as well as the clock pulses to the shift register.

12. Installation for multiplex transmission according to claim 8 characterised in that each multiplexing circuit also comprises as an element in series with the transmission path means responsive to the registration of the detection of a first pulse signal in the multiplex memory for preventing the transmission of information on the path downstream.

13. Installation for multiplex transmission according to claim 8 characterised in that the generator produces before each second pulse signal a fourth pulse signal different from the first, second and third pulse signals and in that each detector comprises an analogue to digital converter with controlled sampling and in that each multiplexing circuit comprises means for controlling the sampling at each detection of the fourth pulse signal.

14. Installation for the multiplex transmission of signals delivered by a plurality of sensors comprising a transmission path having one end connected to a generator of first pulse signals and the other end connected to a recording unit, each sensor being coupled to the path by means of multiplexing circuit connected in series with the path characterised in that each sensor provides in digital form the detected information and that each multiplexing circuit comprises:

a. at least one shift register, capable of being loaded with the digital information from said sensor and of being operatively coupled to the downstream side of the transmission path in order to apply the digital information thereto in the form of a succession of encoded pulses,
b. first pulse signal detector means coupled to the upstream side of the transmission path,
c. means for applying clock pulses to the shift register after the detection of the first pulse signal, the generator producing from time to time a second pulse signal different from the first pulse signal, each detector comprising a digitiser with controlled sampling and each multiplexing circuit comprising also means for controlling the sampling at each detection of the second pulse signal.

15. Installation for multiplex transmission according to claim 4 characterised in that each multiplexing circuit further includes as an element in series with the transmission path, means for suppressing at least a part of the first pulse signal.

16. Installation for multiplex transmission according to claim 1 characterised in that the main generator and the central registering unit are disposed in the vicinity of each other and that the path forms a loop between these two elements.

17. Installation for multiplex transmission according to claim 16 characterised in that the two strands of the loop are found in the same cable of conductors.

18. Installation for multiplex transmission according to claim 17 characterised in that the assemblies associated with the said cable are assemblies having two sections, a first section for connecting a detector to one strand of the path and a second section comprising a simple electric connection.

19. Installation for multiplex transmission according to claim 18 characterised in that the connection between two section assemblies is made by connecting elements each having two crossed conductors.

20. Installation for multiplex transmission according to claim 19 characterised in that the connection means are connected to the assemblies by connection systems which differ from one element to an adjacent element.

21. Installation for multiplex transmission according to claim 3 characterised in that the main generator and the central registering unit are disposed in the vicinity of each other and that the path forms a loop between these two elements.

22. Installation for multiplex transmission according to claim 21 characterised in that the two strands of the loop are found in the same cable of conductors.

23. Installation for multiplex transmission according to claim 22 characterised in that the assemblies associated with the said cable are assemblies having two sections a first section for connecting a detector to one strand of the path and a second section comprising a simple electric connection.

24. Installation for multiplex transmission according to claim 23 characterised in that the connection between two section assemblies is made by connecting elements each having two crossed conductors.

25. Installation for multiplex transmission according to claim 24 characterised in that the connection means are connected to the assemblies by connection systems which differ from one element to an adjacent element.

26. Installation for multiplex transmission according to claim 3 characterised in that the sensors are responsive to seismic vibrations.

27. Installation for multiplex transmission according to claim 5 characterised in that the main generator and the central registering unit are disposed in the vicinity of each other and that the path forms a loop between these two elements.

28. Installation for multiplex transmission according to claim 27 characterised in that the two strands of the loop are found in the same cable of conductors.

29. Installation for multiplex transmission according to claim 28 characterised in that the assemblies associated with the said cable are assemblies having two sections, a first section for connecting a detector to one strand of the path and a second section comprising simple electric connection.

30. Installation for multiplex transmission according to claim 29 characterised in that the transmission between two section assemblies is made by connecting elements each having two crossed conductors.

31. Installation for multiplex transmission according to claim 30 characterised in that the connection means are connected to the assemblies by connection systems which differ from one element to an adjacent element.

32. Installation for multiplex transmissions according to claim 5 characterised in that the sensors are responsive to seismic vibrations.

* * * * *